United States Patent
Yoshida et al.

(10) Patent No.: US 9,826,141 B2
(45) Date of Patent: *Nov. 21, 2017

(54) IMAGING APPARATUS

(71) Applicant: Ricoh Company, Ltd., Tokyo (JP)

(72) Inventors: Akihiro Yoshida, Nakano-ku (JP); Noriaki Ojima, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,615

(22) Filed: Apr. 3, 2015

(65) Prior Publication Data

US 2015/0215523 A1  Jul. 30, 2015

Related U.S. Application Data

(63) Continuation of application No. 13/720,066, filed on Dec. 19, 2012, now Pat. No. 9,036,071.

(30) Foreign Application Priority Data

Dec. 21, 2011 (JP) ................................. 2011-279826

(51) Int. Cl.
*H04N 5/232* (2006.01)
*G03B 3/00* (2006.01)
*H04N 5/235* (2006.01)

(52) U.S. Cl.
CPC ....... *H04N 5/23212* (2013.01); *H04N 5/2351* (2013.01); *H04N 5/23293* (2013.01)

(58) Field of Classification Search
CPC .......... H04N 5/23212; H04N 5/23216; H04N 5/23293; H04N 5/23296; G02B 7/10; G02B 7/102; G02B 7/09

(Continued)

(56) References Cited

U.S. PATENT DOCUMENTS 6,930,712 B1  8/2005  Higuchi et al.
8,614,762 B2  12/2013  Hamada
(Continued)

FOREIGN PATENT DOCUMENTS

JP   62-284587   12/1987
JP   11-341331   12/1999
(Continued)

OTHER PUBLICATIONS

Office Action dated Jun. 2, 2015 in Japanese Patent Application No. 2011-279826.
(Continued)

*Primary Examiner* — Xi Wang
(74) *Attorney, Agent, or Firm* — Oblon, McClelland, Maier & Neustadt, L.L.P.

(57) ABSTRACT

An imaging apparatus includes a shooting lens having a focus lens for adjusting a degree of focus on an imaging plane; an image sensor converting an optical image of a photographic subject to an electric image signal and outputting it; a confirmation image creator creating a focus state confirmation image in which a part, or a whole of an image expressed by the image signal is enlarged; a display displaying the focus state confirmation image; and a focus evaluation value calculator calculating a focus evaluation value based on the image signal; wherein when a state of an inclination of change in a focus evaluation value calculated at a plurality of positions of the focus lens while moving the focus lens is different from a state of an inclination of change in a focus evaluation value calculated immediately before, the focus state confirmation image is displayed on the display.

13 Claims, 12 Drawing Sheets

(58) Field of Classification Search
USPC .... 348/345–356; 396/79, 89, 103, 133, 147, 396/148
See application file for complete search history.

(56) References Cited

U.S. PATENT DOCUMENTS

| | | | |
|---|---|---|---|
| 2001/0012072 A1* | 8/2001 | Ueno | H04N 5/23293 348/333.02 |
| 2002/0080260 A1 | 6/2002 | Ojima | |
| 2002/0149689 A1 | 10/2002 | Sannoh et al. | |
| 2003/0071908 A1 | 4/2003 | Sannoh et al. | |
| 2003/0133025 A1 | 7/2003 | Ojima et al. | |
| 2003/0169346 A1 | 9/2003 | Ojima et al. | |
| 2003/0231291 A1 | 12/2003 | Kitajima et al. | |
| 2004/0169766 A1 | 9/2004 | Yoshida | |
| 2004/0252225 A1 | 12/2004 | Ojima et al. | |
| 2005/0062875 A1 | 3/2005 | Ojima | |
| 2005/0231601 A1 | 10/2005 | Higuchi | |
| 2006/0044452 A1* | 3/2006 | Hagino | G02B 7/28 348/345 |
| 2006/0061677 A1 | 3/2006 | Yoshida | |
| 2007/0030369 A1 | 2/2007 | Ojima et al. | |
| 2007/0176933 A1 | 8/2007 | Culpi et al. | |
| 2007/0212055 A1 | 9/2007 | Yoshida | |
| 2007/0263909 A1 | 11/2007 | Ojima et al. | |
| 2007/0263933 A1 | 11/2007 | Ojima et al. | |
| 2007/0263934 A1 | 11/2007 | Ojima et al. | |
| 2008/0074531 A1* | 3/2008 | Ide | G03B 3/00 348/346 |
| 2008/0278619 A1* | 11/2008 | Otsu | G02B 7/365 348/349 |
| 2009/0047010 A1 | 2/2009 | Yoshida et al. | |
| 2009/0115869 A1 | 5/2009 | Ojima et al. | |
| 2009/0141152 A1 | 6/2009 | Ojima et al. | |
| 2009/0202235 A1 | 8/2009 | Li et al. | |
| 2009/0207298 A1* | 8/2009 | Kawanishi | H04N 5/23212 348/345 |
| 2009/0213239 A1 | 8/2009 | Yoshida | |
| 2009/0256951 A1 | 10/2009 | Yumiki | |
| 2010/0253825 A1 | 10/2010 | Horie | |
| 2010/0322611 A1 | 12/2010 | Yoshida et al. | |
| 2011/0109778 A1 | 5/2011 | Yoshida | |
| 2011/0109789 A1 | 5/2011 | Himuro et al. | |
| 2011/0115940 A1 | 5/2011 | Ojima et al. | |

FOREIGN PATENT DOCUMENTS

| | | |
|---|---|---|
| JP | 2004-85673 | 3/2004 |
| JP | 2004-242009 | 8/2004 |
| JP | 2007-248615 | 9/2007 |
| JP | 2007-248616 A | 9/2007 |
| JP | 2011-228795 | 11/2011 |

OTHER PUBLICATIONS

Office Action dated Nov. 17, 2015 in Japanese Patent Application No. 2011-279826.

\* cited by examiner

FIG.12A
FIG.12B
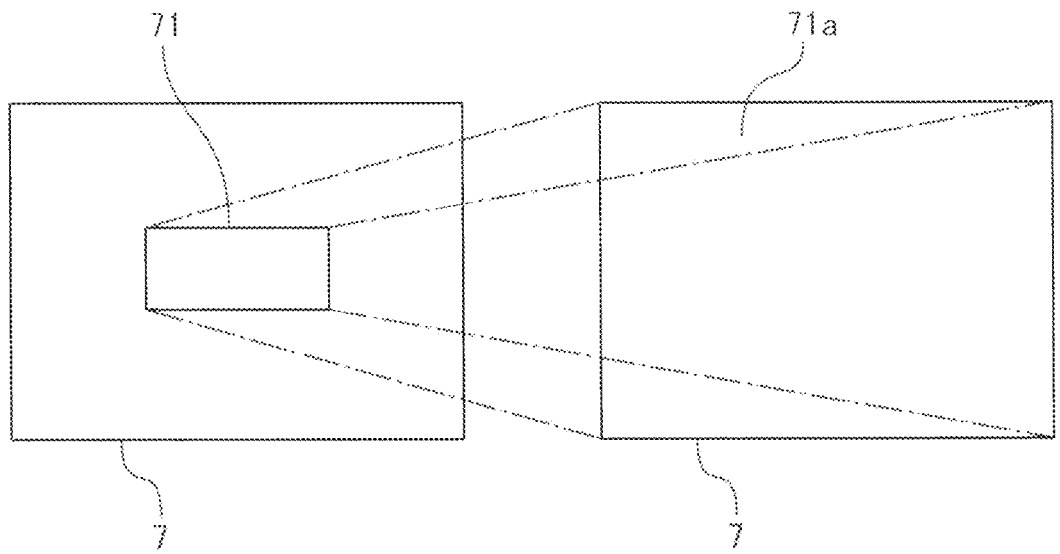
FIG.13A
FIG.13B
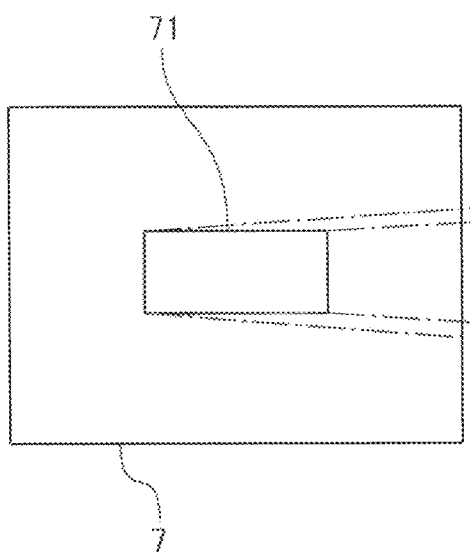
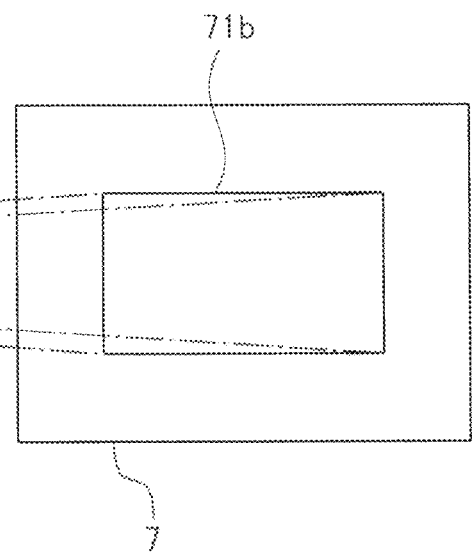

IMAGING APPARATUS

CROSS-REFERENCE TO RELATED APPLICATIONS

The present application is a Continuation application of U.S. application Ser. No. 13/720,066 filed Dec. 19, 2012 and is based on and claims priority from Japanese Patent Application Number 2011-279826, filed Dec. 21, 2011, the disclosure of which is hereby incorporated by reference herein in its entirety.

BACKGROUND

The present invention relates to an imaging apparatus. In particular, the present invention relates to an imaging apparatus having a function that displays an image in which the degree of focus on a photographic subject to be imaged is easily recognized visibly.

An imaging apparatus is known that displays an image of a photographic subject received by an image sensor on a display of a liquid crystal display (LCD), or the like, which can be visibly recognized by a user. The imaging apparatus has a function that displays a live image of a photographic subject on the display before shooting. This is generally referred to as a live view display function.

As for a focus operation of such an imaging apparatus, a manual operation and an automatic operation are known. The manual operation is called a manual focus (hereinafter, referred to as "MF"), and the automatic operation is called an autofocus (hereinafter, referred to as "AF"). For example, Japanese Patent Application Publication number H11-341331 discloses an imaging apparatus that magnifies a display and displays a larger image than would be displayed with a normal live view, when performing the MF and the AF. Additionally, for example, Japanese Patent Application Publication number 2004-242009 discloses an imaging apparatus that displays an image in which a region that is most in focus in an image of a photographic subject displayed as a live view image is enlarged, when performing the MF.

When performing the AF and the MF, as a method of displaying an image that is displayed for confirming a degree of focus on an image of a photographic subject, in addition to the above-described enlarged display of a live view image, there are "a method of displaying an image of only an edge part of a photographic subject", "a method of displaying an image in which an edge part is enhanced by an overlapped image of an image of an edge part of a photographic subject and a normal live view image", and the like.

In imaging apparatuses disclosed in Japanese Patent Application Publication number H11-341331 and Japanese Patent Application Publication number 2004-242009, by displaying an enlarged image, or the like when performing the AF and the MF, the degree of focus is easily confirmed. In fact, it is easy to confirm the degree of focus by displaying the enlarged image; however, it is difficult to confirm a composition and a state of an entire photographic subject by a live view image.

SUMMARY

An object of the present invention is to provide an imaging apparatus that confirms the composition and state of an entire photographic subject, and confirms the degree of focus.

In order to achieve the above object, an embodiment of the present invention provides: an imaging apparatus, comprising: a shooting lens having a focus lens for adjusting a degree of focus on an imaging plane; an image sensor that is arranged on an imaging plane of the shooting lens, converts an optical image of a photographic subject inputted via the shooting lens to an electric image signal and outputs it; a confirmation image creator that creates a focus state confirmation image in which a part, or a whole of an image expressed by the image signal outputted by the image sensor is enlarged; a display that displays the focus state confirmation image; and a focus evaluation value calculator that calculates a focus evaluation value, which is a value for indicating the degree of focus on the photographic subject, based on the image signal outputted by the image sensor; wherein when a state of an inclination of change in a focus evaluation value calculated at a plurality of positions of the focus lens by the focus evaluation value calculator while moving the focus lens is different from a state of an inclination of change in a focus evaluation value calculated immediately before, the focus state confirmation image created by the confirmation image creator is displayed on the display.

In order to achieve the above object, an embodiment of the present invention provides: an imaging apparatus, comprising: a shooting lens having a focus lens for adjusting a degree of focus on an imaging plane; an image sensor that is arranged on an imaging plane of the shooting lens, converts an optical image of a photographic subject inputted via the shooting lens to an electric image signal and outputs it; a confirmation image creator that creates a focus state confirmation image in which a part, or a whole of an image expressed by the image signal outputted by the image sensor is enlarged; and a display that displays the focus state confirmation image; wherein when a moving direction of the focus lens is different from an immediately previous moving direction of the focus lens, the focus state confirmation image created by the confirmation image creator is displayed on the display.

Each of FIGS. 12A and 12B is an image diagram illustrating an example of the focus state confirmation image displayed by the imaging apparatus.

Each of FIGS. 13A and 13B is an image diagram illustrating another example of the focus state confirmation image displayed by the imaging apparatus.

Figure 14:
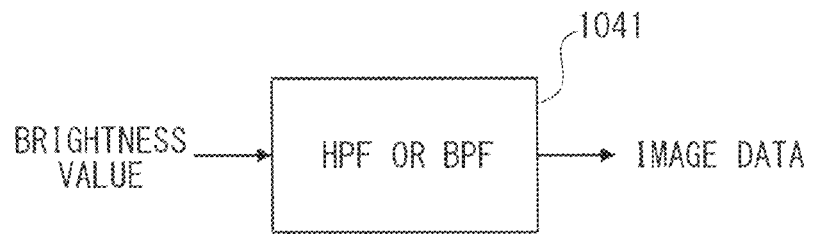

FIG. 14 is a block diagram illustrating an example of an edge extractor included in the imaging apparatus.

Figure 15:
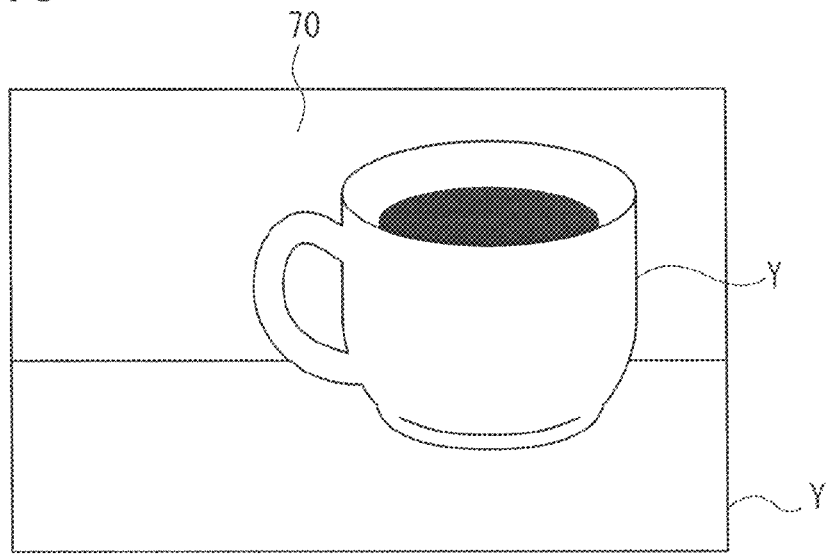

FIG. 15 is a diagram illustrating an example of a live view image displayed on a display included in the imaging apparatus.

Figure 16:
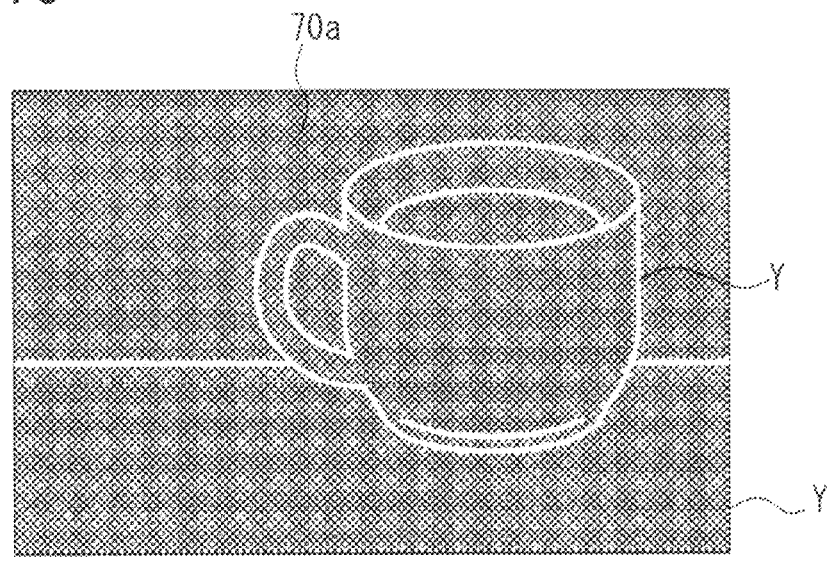

FIG. 16 is an image diagram illustrating still another example of the focus state confirmation image displayed by the imaging apparatus.

Figure 17:
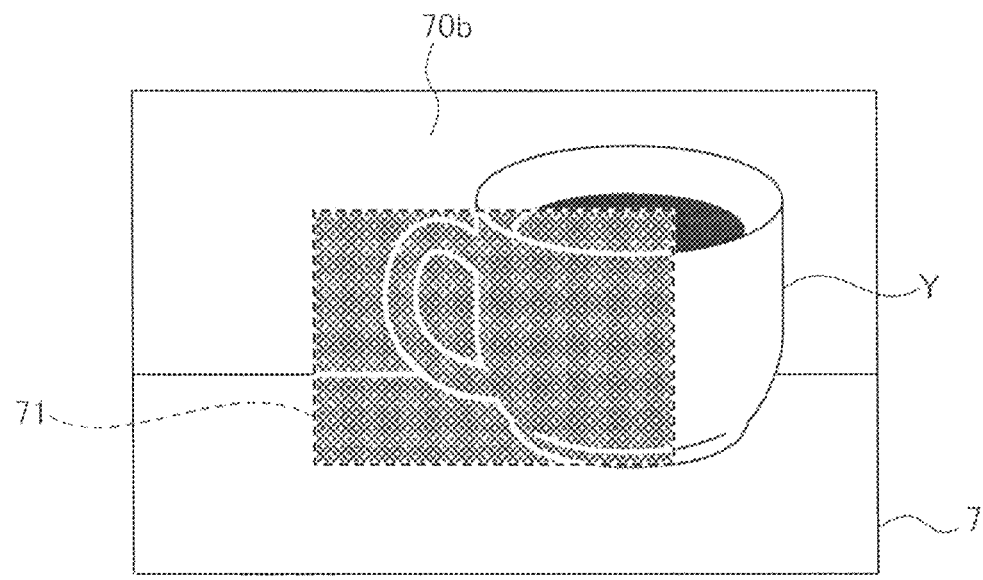

FIG. 17 is an image diagram illustrating still another example of the focus state confirmation image displayed by the imaging apparatus.

Figure 18:
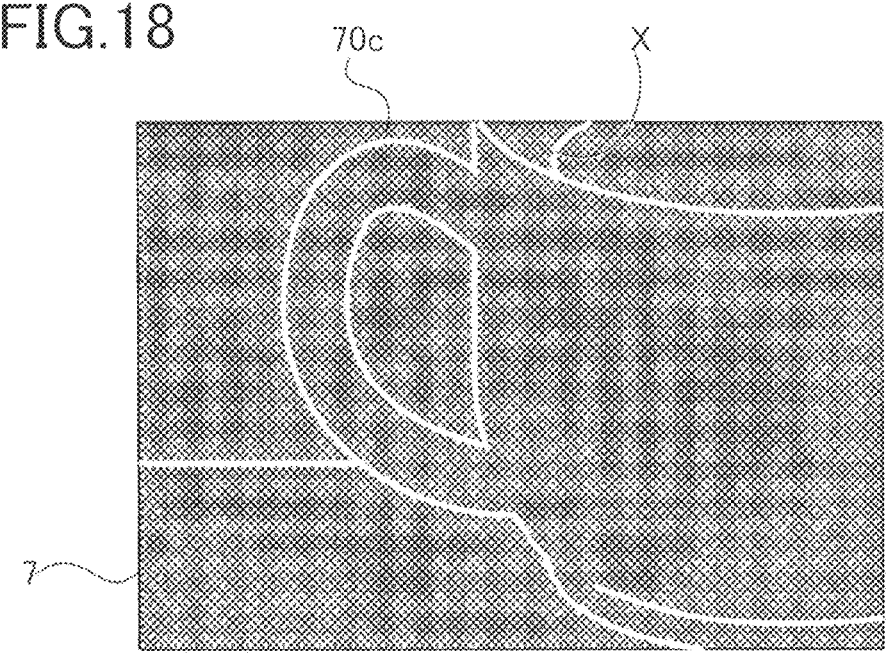

FIG. 18 is an image diagram illustrating still another example of the focus state confirmation image displayed by the imaging apparatus.

Figure 19:
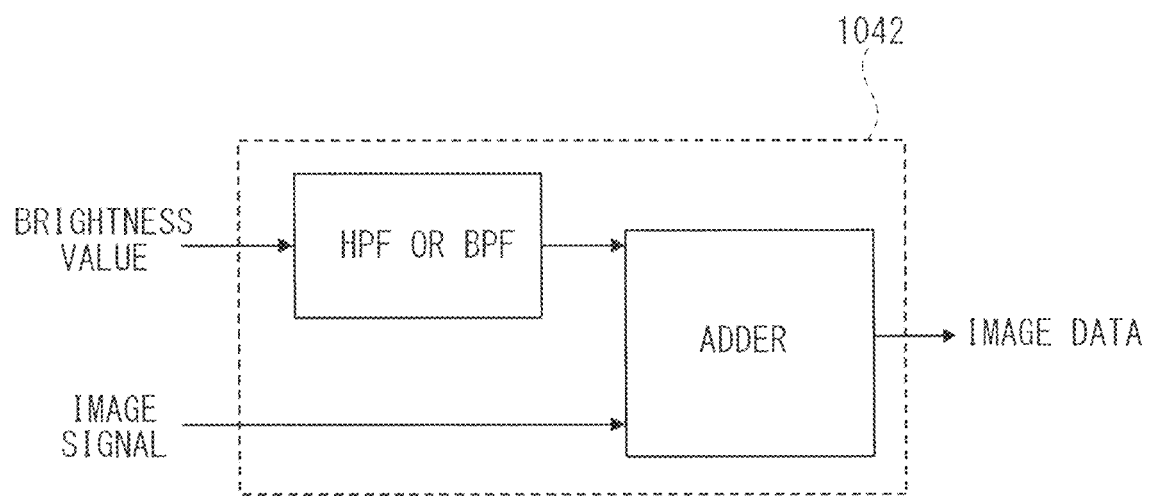

FIG. 19 is a block diagram illustrating an example of an edge enhancer included in the imaging apparatus.

Figure 20:
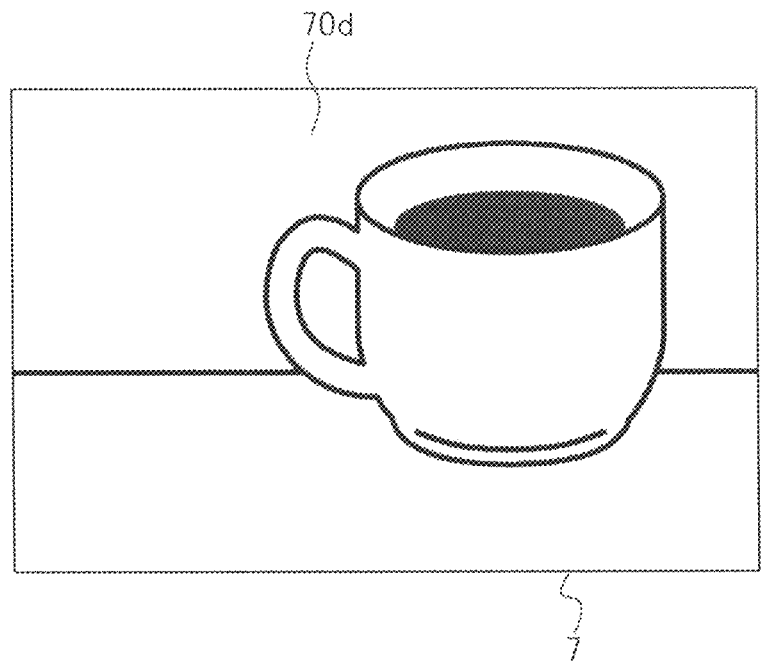

FIG. 20 is an image diagram illustrating still another example of the focus state confirmation image displayed by the imaging apparatus.

Figure 21:
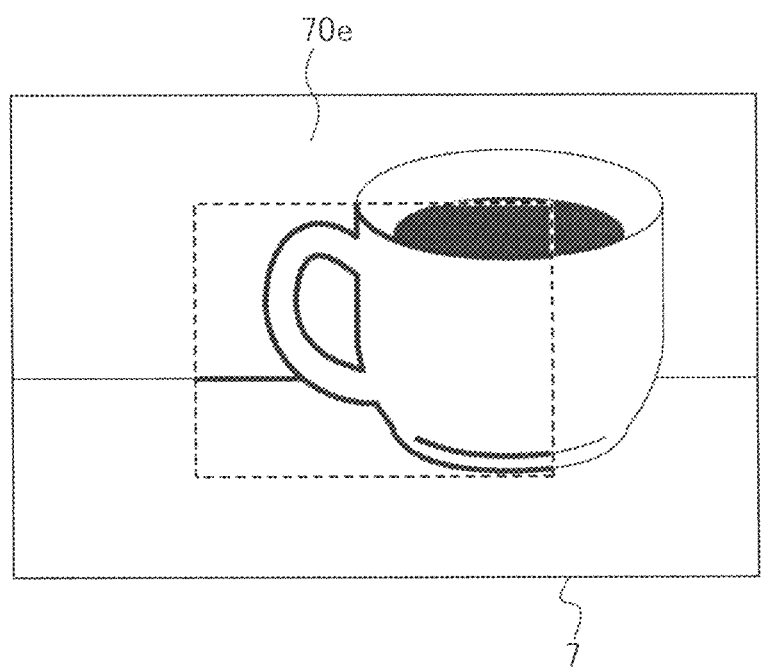

FIG. 21 is an image diagram illustrating still another example of the focus state confirmation image displayed by the imaging apparatus.

Figure 22:
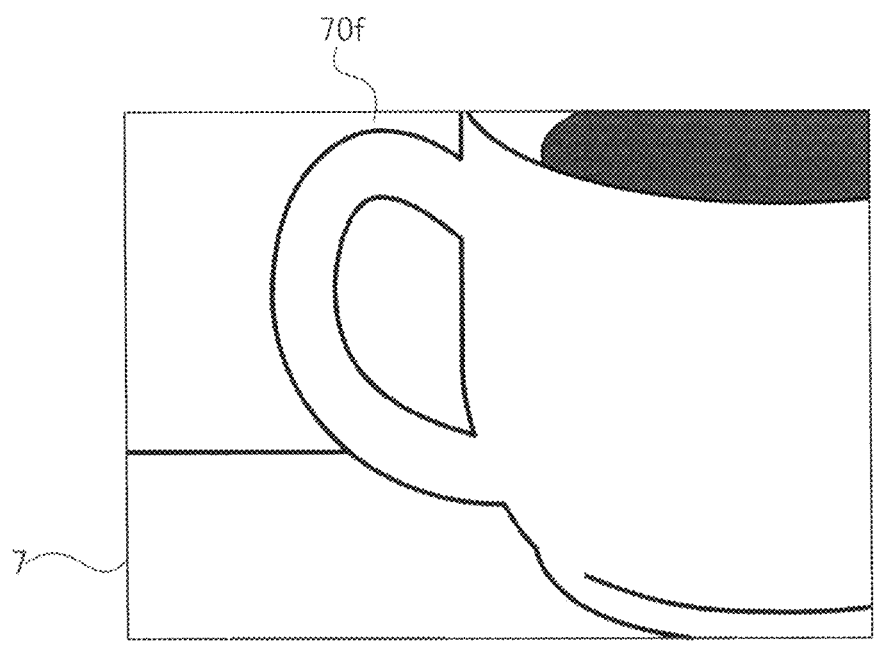

FIG. 22 is an image diagram illustrating still another example of the focus state confirmation image displayed by the imaging apparatus.

DETAILED DESCRIPTION OF THE PREFERRED EMBODIMENTS

Hereinafter, an imaging apparatus according to an embodiment of the present invention will be explained with reference to the drawings.

Figure 1:
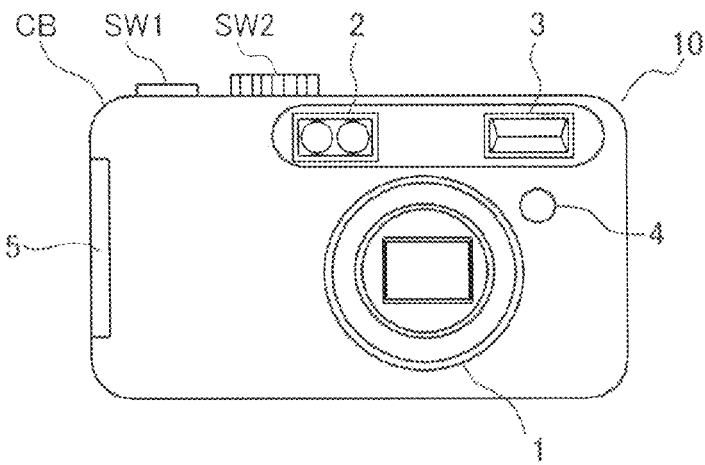
FIG. 1 is a front view of an imaging apparatus according to an embodiment of the present invention.
Figure 2:
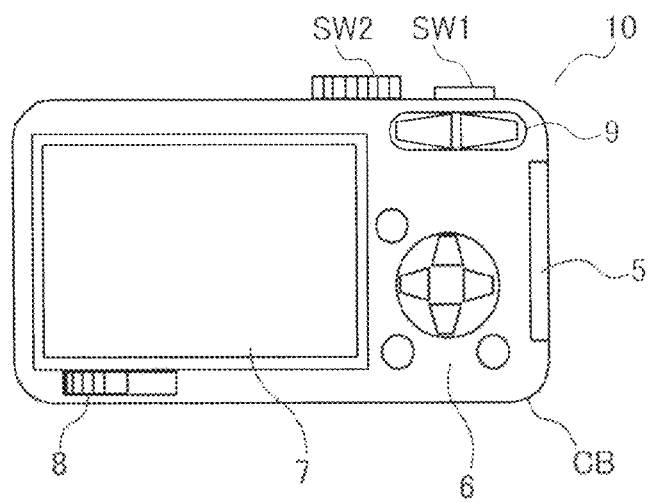
FIG. 2 is a rear view of the imaging apparatus.
Figure 3:
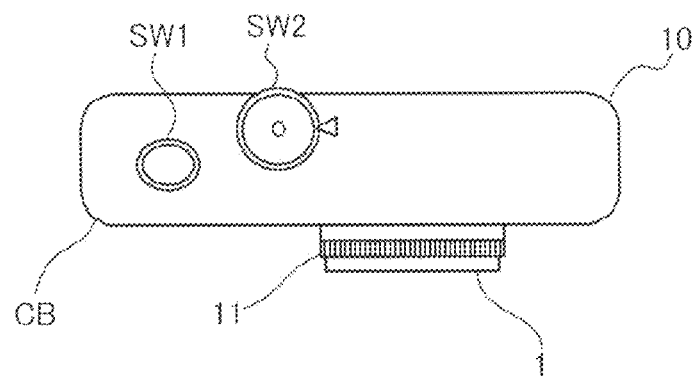
FIG. 3 is a top view of the imaging apparatus.

FIGS. 1 to 3 are external views of a digital camera as an example of the imaging apparatus according to the embodiment of the present invention. FIG. 1 is a front view, FIG. 2 is a rear view, and FIG. 3 is a top view. As illustrated in FIG. 1, a digital camera 10 according to the embodiment of the present invention has a lens barrel unit 1 including a shooting lens (including a focus lens), a distance-metering unit 2 including a lens for distance metering, and an element for distance metering, a flash 3, and a remote control light receiver 4, which are arranged on a front surface of a camera body CB. On one of side surfaces of the camera body CB, a cover 5 of a memory card slot and a battery slot is provided.

On a rear surface of the digital camera, as illustrated in FIG. 2, an operation key part 6, an LCD monitor 7 as a display that displays an image of a photographic subject imaged on an image sensor by the shooting lens, a power switch 8, and a zoom button 9 are arranged. Note that in the embodiment, the display included in the digital camera 10 is not only limited to the LCD monitor 7, but also can be an electronic viewfinder (EVF).

Additionally, as illustrated in FIG. 3, on a top surface of the digital camera 10, a shutter release button SW1, and a dial switch SW2 that switches operation modes of the digital camera 10 are arranged. The operation modes of the digital camera 1 are a shooting mode, and a playback mode. An autofocus (AF) mode, a manual focus (MF) mode, and the like are included in the shooting mode. Note that in the embodiment of the present invention, in the manual focus (MF) mode, movement of the focus lens 1-2a is performed by operating a focus ring 11, which is described later, by a user.

Additionally, as illustrated in FIG. 3, in the lens barrel unit 1, the focus ring 11 for operating the focus lens manually is arranged. The focus ring 11 is arranged on an outer circumference of the lens barrel unit 1 which is round in a frontal view, and is a member that rotates around a center of the focus lens. When a user rotates the focus ring 11, the focus lens arranged in the lens barrel unit 11 moves forward and backward in a direction of an optical axis of the image sensor. By this movement of the focus lens, the degree of focus on the image of the photographic subject on an imaging plane of the image sensor changes.

Figure 4:
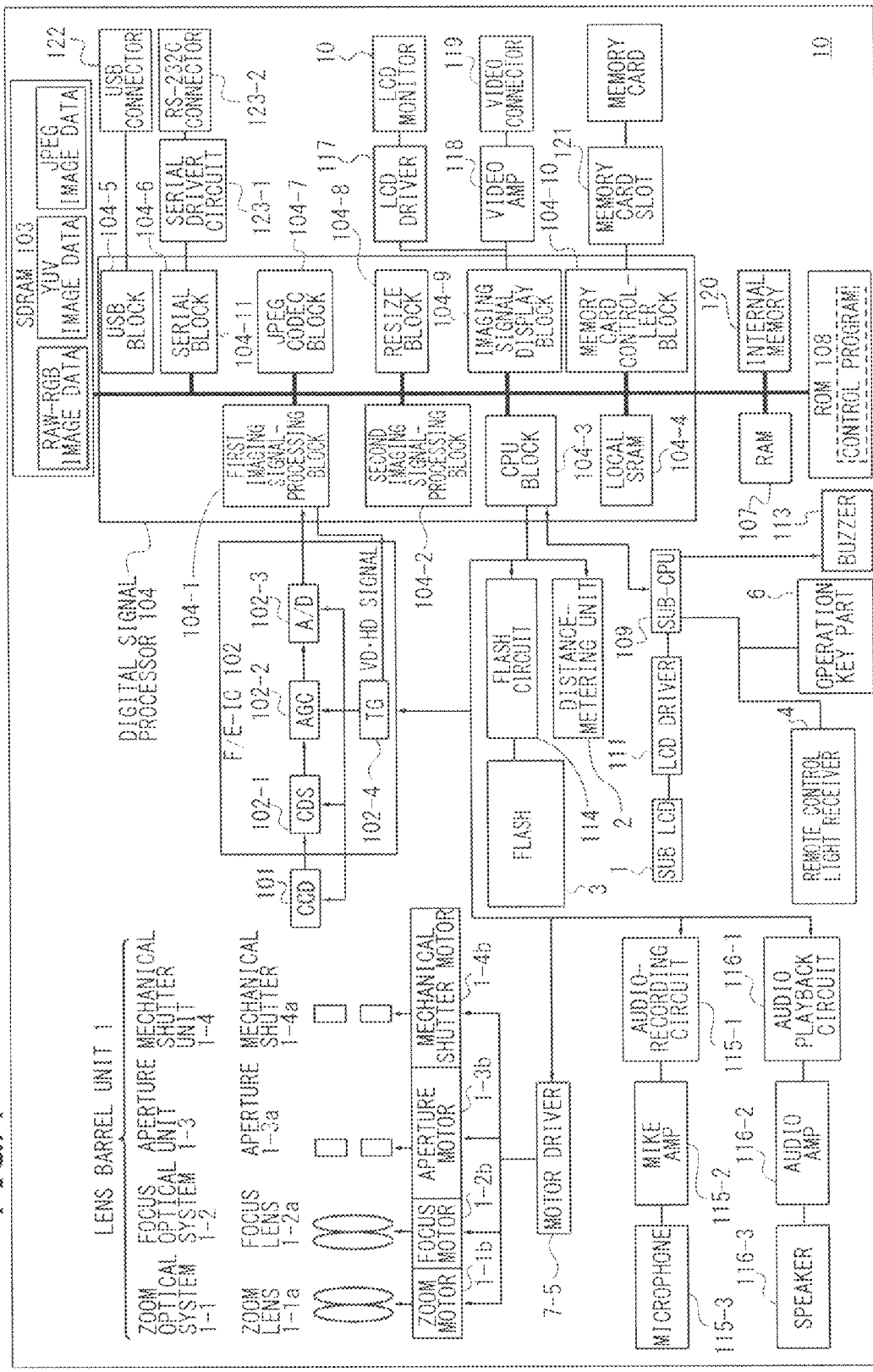
FIG. 4 is a functional block diagram illustrating an example of a control system of the imaging apparatus.

Next, an example of a functional block of the imaging apparatus according to the embodiment of the present invention will be explained by use of FIG. 4. Various movements (operations) of the imaging apparatus according to the embodiment of the present invention are controlled by a program stored in a ROM 109 in advance, and a digital signal processor 104 (hereinafter, referred to as "a processor 104") structured as a digital signal-processing IC (Integrated Circuit), and the like. The processor 104 includes a first imaging signal-processing block 104-1, a second imaging signal-processing block 104-2, a CPU (Central Processing Unit) block 104-3, a local SRAM (SRAM: Static Random Access Memory) 104-4, a USB (Universal Serial Bus) block 104-5, a serial block 104-6, a JPEG codec block 104-7, a resize block 104-8, an image signal display block 104-9, and a memory card controller block 104-10. Each block above is mutually connected by a bus line.

Outside the processor 104, a SRAM (Synchronous Random Access Memory) 103 that stores RAW-RGB image data, YUV image data, and JPEG image data, a RAM 107, an internal memory 120, and the ROM 109 that stores the control program are arranged, and those are connected to the processor 104 via a bus line.

The lens barrel unit 1 includes a zoom optical system 1-1 having a zoom lens 1-1a, a focus optical system 1-2 having a focus lens 1-2a, an aperture unit 1-3 having an aperture 1-3a, and a mechanical shutter unit 1-4 having a mechanical shutter 1-4a. The zoom optical system 1-1, the focus optical system 1-2, the aperture unit 1-3, and the mechanical shutter unit 1-4 are driven by a zoom motor 1-1b, a focus motor 1-2b, an aperture motor 1-3b, and a mechanical shutter motor 1-4b, respectively. Each motor of the zoom motor 1-1b, the focus motor 1-2b, the aperture motor 1-3b, and the mechanical shutter motor 1-4b is driven by a motor driver 7-5, and movements of the motor driver 7-5 are controlled by the CPU block 104-3.

Additionally, when the manual focus (MF) mode is selected by the dial switch SW2, the focus lens 1-2a is moved by an operation of the focus ring 11 (see FIG. 3).

The zoom lens 1-1 a and the focus lens 1-2a of the lens barrel unit 1 constitute a shooting lens for imaging an image of a photographic subject on an imaging plane of a CCD (Charge-Coupled Device) 101. The CCD 101 converts an optical image of the photographic subject inputted via the shooting lens to an electric image signal, and outputs it to a F/E-IC (Front/End-IC) 102. Note that the CCD 101 is an example of an image sensor that is applicable to the imaging apparatus according to the embodiment of the present invention, and types of the image sensor are not limited thereto, and a CMOS (Complementary Metal-Oxide Semiconductor) is also applicable.

The F/E-IC 102 includes a CDS (Correlated Double Sampler) 102-1, an AGC (Auto Gain Controller) 102-2, and an A/D (Analog/Digital) convertor 102-3. The F/E-IC 102 performs a predetermined operation on an inputted image signal from the CCD 101, and outputs it as a digital image signal. This digital image signal is inputted to the first imaging signal-processing block 104-1 of the processor 104.

As for those signal-processing operations related to the F/E-IC 102, operation timing is controlled by a VD signal (Vertical Drive signal) and a HD signal (Horizontal Drive signal) outputted from the first imaging signal-processing block 104-1. A TG (Timing Generator) 102-4 controls the above signal-processing operations to be performed in accordance with the VD signal and the HD signal.

The first imaging signal-processing block 104-1 performs signal-processing operations such as a white balance adjustment, a γ adjustment, and the like on the inputted digital image signal from the CCD 101 via the F/E-IC 102. Additionally, as described above, the first imaging signal-processing block 104-1 outputs the VD signal and the HD signal to the TG 102-4 that controls the signal processing-operations of the F/E-IC 102.

The CPU block 104-3 of the processor 104 controls an audio-recording operation by an audio-recording circuit 115-1. The audio-recording circuit 115-1 records an audio signal that is converted by a microphone (mike) 115-3 and amplified by a microphone amplifier (mike AMP) 115-2 in accordance with an instruction of the CPU block 104-3.

Additionally, the CPU block 104-3 also controls an operation of an audio playback circuit 116-1. Based on an instruction of the CPU block 104-3, an audio signal recorded in an appropriate memory is amplified by an audio amplifier (audio AMP) 116-2, the audio playback circuit 116-1 inputs it to a speaker 116-3, and outputs it as sound from the speaker 116-3.

Additionally, the CPU block 104-3 emits illumination light from the flash 3 by controlling a flash circuit 114 to operate. And the CPU block 104-3 controls an operation of the distance-metering unit 2 that measures a distance to a photographic subject.

Furthermore, the CPU block 104-3 is also connected to a sub CPU 108 that is arranged outside the processor 104. The sub CPU 108 is also connected to each of the remote control light receiver 4, the operation key part 6, and a buzzer 113. The sub CPU 108 sends a remote control signal received via the remote control light receiver 4 to the CPU block 104-3, and sends a signal in accordance with the operation performed by the operation key part 6 to the CPU block 104-3.

The USB block 104-5 is connected to a USB connector 122. The serial block 104-6 is connected to a RS-232C connector 123-2 via a serial driver circuit 123-1.

The image signal display block 104-9 is connected to a LCD monitor 7 via a LCD driver 117, and is also connected to a video connector 119 via a video amplifier (AMP) 118.

The memory card controller block 104-10 is connected to a card contact of the memory card slot 121. When a memory card is inserted in the memory card slot 121, a contact of the memory card is in contact with the card contact of the memory card slot 121, and electrically connected. Then, an image file is recorded in the inserted memory card.

Next, an operation of the digital camera 10 will be explained. When power is applied by an operation of the power switch 8 (see FIG. 2), by way of the sub CPU 108, the CPU block 104-3 detects a setting of the dial switch SW2, and sets an operation mode. And then, the CPU block 104-3 controls the motor driver 7-5, and moves the lens barrel unit 1 to an imageable position. In addition, power is applied to each part of the CCD 101, the F/E-IC 102, the LCD monitor 7, and the like, and the digital camera 10 is in an operation start state. When the digital camera 100 is in the operation start state, a live view image is displayed on the LCD monitor 7.

The live view image is an image of a photographic subject imaged by the CCD 101 as the image sensor via the shooting lens of the lens barrel unit 1 that is consecutively displayed at a predetermined frame rate (for example, 60 frames per second).

An image of a photographic subject imaged on a light-receiving surface of the CCD 101 is outputted as an electric signal (image signal). The electric signal is an analog signal of R (Red), G (Green), and B (Blue). This RGB analog signal is inputted to the CDS 102-1, and then inputted to the A/D convertor 102-3 via the AGC 102-2, and converted to a RGB digital signal in the A/D convertor 102-3. The converted RGB digital signal is converted to YUV image data by a YUV convertor included in the second imaging signal-processing block 104-2 in the processor 104.

The converted YUV image data is stored in the SRAM 103 as a frame memory. Note that the second imaging signal-processing block 104-2 performs an appropriate operation such as a filtering operation, or the like on the RGB digital signal (image signal), and converts it to YUV image data. The YUV image data is read out by the CPU block 104-3, and via the image signal display block 104-9, outputted to an external display device (a television, or the like) via the video AMP 118, and the video connector 119, and then displayed. Or, the YUV image data is outputted to the LCD monitor 7 via the LCD driver 117, and then displayed as a live view image.

Along with starting to display a live view image, the first imaging signal-processing block 104-1 starts to calculate a focus evaluation value that shows a degree of focus on a photographic subject from inputted RGB digital signal. The focus evaluation value is information regarding an image of a photographic subject that is acquired for imaging by the digital camera 10.

The focus evaluation value is calculated at intervals of a predetermined time while moving the focus lens 1-2a in the direction of the optical axis. That is, the focus lens 1-2a is moved by only a predetermined amount, an image signal of a photo graphic subject is read out from an image sensor, contrast information is taken out from the image signal, and the focus evaluation value is calculated based on the contrast information. And a position of the focus lens 1-2a that shows a maximum value of the focus evaluation value is an in-focus position. A method that thus determines the in-focus position based on the acquired image information while moving the focus lens 1-2a is called "a hill-climbing method".

In the AF, a focus evaluation value is calculated while moving the focus lens 1-2a, and an in-focus position is automatically determined. In the MF, while the focus ring 11 (see FIG. 2) is manually operated by a user and a focus evaluation value is calculated at intervals of a predetermined time, an in-focus position is determined by the user. The imaging apparatus according to the embodiment of the present invention is applicable to both the AF and the MF.

Note that the contrast information used for calculation of the focus evaluation value is obtained in the following manner. For example, a predetermined region of an imaging plane of the CCD 101 is divided into a plurality of areas (128 areas, for example), and per divided area, an average brightness value of an image included in the divided area is calculated, and then a difference of the average brightness value of adjacent areas is calculated, and those calculated differences are added together. In particular, when comparing an in-focus state and an out-of-focus state, in the in-focus state, the difference of the average brightness value of the adjacent areas is large, and therefore, a total value of the differences of the average brightness values is large. In the in-focus position, the total value is a maximum value, and therefore, by determining the maximum value of the focus evaluation value, it is possible to determine the position of the focus lens 1-2a as the in-focus position.

The focus evaluation value can be calculated by using an image included in entire regions outputted by the CCD 101, or can be calculated by using an image included in a part of the regions. For example, by using an image included in a specific region around the center of the entire regions, the focus evaluation value can be calculated.

Figure 5:
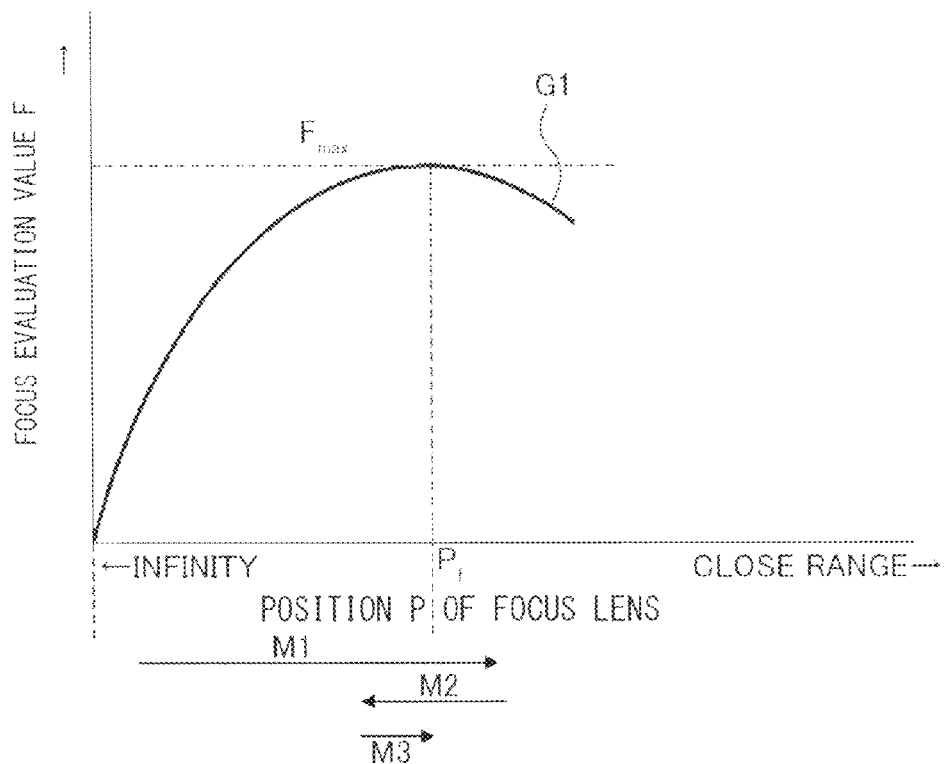
FIG. 5 is a graph illustrating an example of a change in contrast information used for a focus adjustment by the imaging apparatus.

Next, a correlation between the focus lens 1-2a and the focus evaluation value will be explained by using FIG. 5. In a graph G1 illustrated in FIG. 5, a position of the focus lens 1-2a is shown on a horizontal axis, and a magnitude of a focus evaluation value F is shown on a vertical axis. Each arrow illustrated under the horizontal axis shows an example of a moving direction and a moving range of the focus lens 1-2a. Firstly, the focus lens 1-2 moves from infinity toward a close range (arrow M1). Along with the movement of the focus lens 1-2a, as described above, contrast of the image of the photographic subject becomes clearer, and therefore, the focus evaluation value F increases. Notes that the focus evaluation value F is calculated at intervals of a predetermined time.

In order to determine a maximum value $F_{max}$ of the focus evaluation value F, the focus lens 1-2a is controlled to move in a direction (M1) where the focus evaluation value F increases so as to pass by an in-focus position $P_f$ once. When the focus lens 1-2a passes by the in-focus position $P_f$, the focus evaluation value F changes from a previous increasing trend to a decreasing trend. That is, a state where a trend of a change in the focus evaluation value F is different, in other words, a position of the focus lens 1-2a at the time of changing from the increasing trend to the decreasing trend is the in-focus position $P_f$. Therefore, when detecting the state where the trend of the change in the focus evaluation value F is different, by determining the focus lens 1-2a to move in a direction (direction denoted by an arrow M2) opposite to a previous moving direction, it is possible to move the focus lens 1-2a closer to the in-focus position $P_f$. A state where the focus lens 1-2a stops at the in-focus position $P_f$ is an in-focus state.

In consideration of backlash of a drive mechanism of the focus lens 1-2a, it is preferable that the focus lens 1-2a that has moved in the direction of the arrow M2 pass by the in-focus position $P_f$ again, and then be reversely moved in a direction of an arrow M3, and be stopped at the in-focus position $P_f$. If there is no need to consider the backlash, the focus lens 1-2a is not needed to be reversely moved in the direction of the arrow M3, and the focus lens 1-2a that has moved in the direction of the arrow M2 is stopped at the in-focus position $P_f$.

The same method of determining the in-focus position $P_f$ is used in the AF and the MF. That is, in order to determine the in-focus position $P_f$, it is necessary to detect the maximum value $F_{max}$ of the focus evaluation value F; however, even in the AF and the MF, it is necessary to control the focus lens 1-2a to pass by the in-focus position $P_f$ once. When detecting that the focus lens 1-2a passes by the in-focus position $P_f$, the focus lens 1-2a is in the vicinity of the in-focus position $P_f$, and therefore, at this time, if a focus state confirmation image (an image for confirming a state of focus on a photographic subject) is displayed on the LCD monitor 7, it is possible for a user of the digital camera 10 to easily confirm the degree of focus.

Example 1

Figure 6:
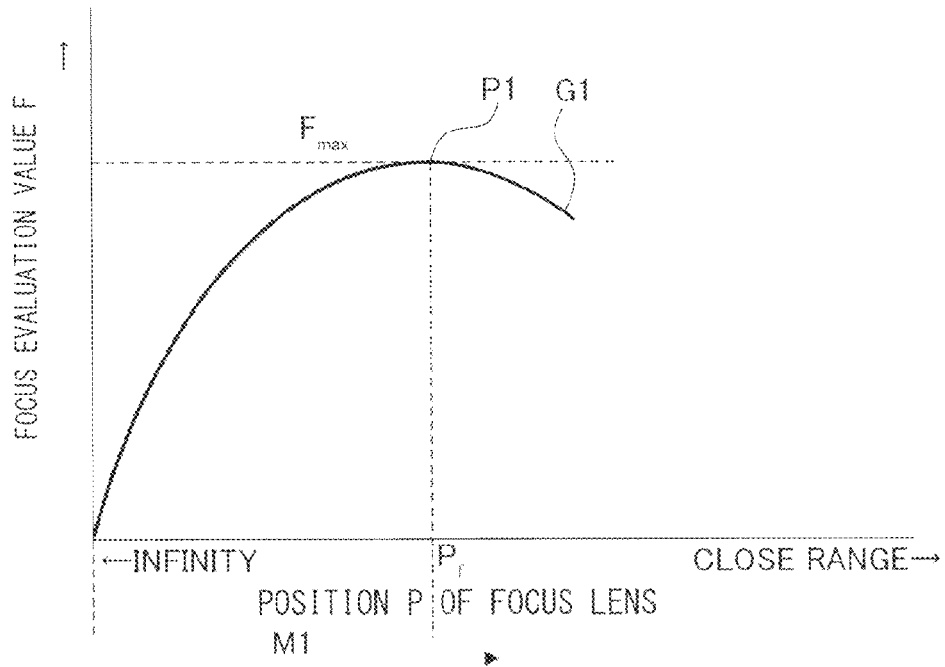
FIG. 6 is a graph illustrating an example of timing of displaying a focus state confirmation image according to the imaging apparatus.

Next, a display timing of the focus state confirmation image performed by the imaging apparatus according to the embodiment of the present invention will be explained. In a graph G1 illustrated in FIG. 6, a position of the focus lens 1-2a is shown on a horizontal axis, and a magnitude of a focus evaluation value F is shown on a vertical axis. An arrow illustrated under the horizontal axis shows an example of a moving direction and a moving range of the focus lens 1-2a. Reference sign P1 shows an example of timing that displays the focus state confirmation image. As illustrated in FIG. 6, when the focus lens 1-2a moves in a direction denoted by an arrow M1, the focus evaluation value F shows an increasing trend. This is because contrast of the image of the photographic subject becomes clearer, as the focus lens 1-2a moves closer to the in-focus position. And then, the focus lens 1-2a passes by a position P1 where the focus evaluation value F is the maximum value $F_{max}$, and the focus evaluation value F changes to a decreasing trend. In order to detect a decrease of the focus evaluation value F, it is only necessary to compare a latest focus evaluation value $F_n$ and a focus value $F_{n-1}$ that is calculated immediately before the latest focus evaluation value $F_n$.

Since the position P1 of the focus lens 1-2a where the focus evaluation value F changes from the increasing trend to the decreasing trend is the in-focus position $P_f$, it is only necessary to monitor an amount of change in the focus evaluation value F, and display the focus state confirmation image on the LCD monitor 7 when the mount of the change in the focus evaluation value F changes from the increasing trend to the decreasing trend. In a state where the focus state confirmation image is displayed, the focus lens 1-2a moves reversely in the direction denoted by the arrow M2, and moves closer to the in-focus position $P_f$ (see FIG. 5), and therefore, it is possible for the user of the digital camera 10 to easily confirm a detailed degree of focus in detail.

When the focus lens 1-2a moves in the direction denoted by the arrow M1, firstly, a normal live view image is displayed on the display, and a composition is rendered to be a state so as to confirm a state of an entire photographic subject. And then, when detecting that the focus evaluation value F changes from the increasing trend to the decreasing trend, that is, when an inclination of the amount of change in the focus evaluation value F is different from an inclination of the amount of change in the focus evaluation value F immediately before, the focus state confirmation image is displayed. Here, the inclination of the amount of change in the focus evaluation value F will be explained. When the focus evaluation value F shows the increasing trend, that is, when $F_n > F_{n-1}$, the inclination of the amount of change in the focus evaluation value F is positive (expressed by "+ (a positive sign)". On the other hand, when the focus evaluation value F shows the decreasing trend, that is, when $F_n < F_{n-1}$, the inclination of the amount of change in the focus evaluation value F is negative (expressed by "− (a negative sign)". Thus, between when the focus evaluation value F is on the increase and when the focus evaluation value F is on the decrease, the inclination of the amount of change in the focus evaluation value F is different.

Figure 7:
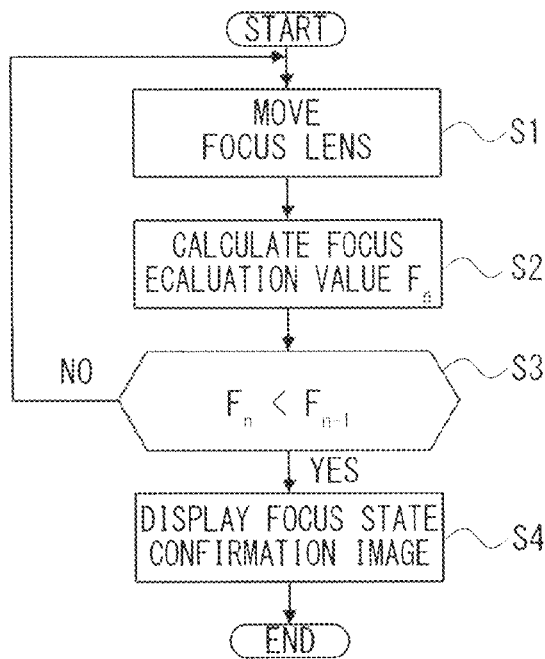
FIG. 7 is a flow diagram illustrating an example of a display operation of the focus state confirmation image according to the imaging apparatus.

Next, an example of a display operation of a focus state confirmation image according to the embodiment of the present invention will be explained by using a flow diagram in FIG. 7. Note that the following explanation supposes the AF; however, the embodiment of the present invention is applicable to the MF.

After power is applied to the digital camera 10 and the focus lens 1-2a moves to an initial position (for example, an infinity position), the AF is started. On the LCD monitor 7, a live view image is displayed, and the focus lens 1-2a moves from the infinity position to a close range position (in the direction of the arrow M1 illustrated in FIG. 6) (step S1). The focus evaluation value F is calculated at intervals of a predetermined time, while moving the focus lens 1-2a (step S2). The calculated focus evaluation value F is stored in a memory (not illustrated) sequentially in chronological order.

Then, "a latest focus evaluation value $F_r$," and "a focus evaluation value $F_{n-1}$ that is stored immediately before (that is calculated at a previous time)" are compared (step S3). When the focus evaluation value $F_n$ is not less than the focus evaluation value $F_{n-1}$ (No of step S3), the focus lens 1-2a is controlled to continuously move in the direction of the arrow M1 (see FIG. 6) (step S1). When the focus evaluation value $F_n$ is less than the focus evaluation value $F_{n-1}$ (Yes of step S3), the focus lens 1-2a passes by the in-focus position $P_f$, and therefore, the focus state confirmation image is displayed on the LCD monitor 7 as the display (step S4).

In the above operation step S3, determination is made by comparing the magnitude of the focus evaluation value $F_n$ and the focus evaluation value $F_{n-1}$; however, in this determination operation, the inclination of the amount of change in the focus evaluation value F can be used. In the case of using the inclination, when signs ("+", "−") that express the inclination of the amount of change in the focus evaluation value F are different between an inclination of an amount of change of the focus evaluation value $F_n$ and an inclination of an amount of change of the focus evaluation value $F_{n-1}$, it is only necessary to display the focus state confirmation image (step S4).

According to the embodiment described above, during displaying the live view image, when an inclination of an amount of change in a focus evaluation value F is different from an inclination of an amount of change in a focus evaluation value F that is stored immediately before, it is possible to start to display the focus state confirmation image. That is, while the focus lens 1-2a moves in the direction of the arrow M2 and closer to the in-focus position $P_f$, it is possible to display the focus state confirmation image. As a result, it is possible for a user of the digital camera 10 to confirm a composition and a state of an entire photographic subject, and confirm a degree of focus.

Note that a case of the AF as the example has been explained; however, in the case of the MF, in the operation step S1, the movement of the focus lens 1-2a that is performed by operating the focus ring 11 by the user is only different from the case of the AF, and other than the above, the same operations are performed.

Example 2

Next, another display timing of the focus state confirmation image performed by the imaging apparatus according to the embodiment of the present invention will be explained. In a graph G1 illustrated in FIG. 8, a position of the focus lens 1-2a is shown on a horizontal axis, and a magnitude of a focus evaluation value F is shown on a vertical axis. An arrow illustrated under the horizontal axis shows an example of a moving direction and a moving range of the focus lens 1-2a. Reference sign P2 shows an example of display timing that displays the focus state confirmation image.

Figure 8:
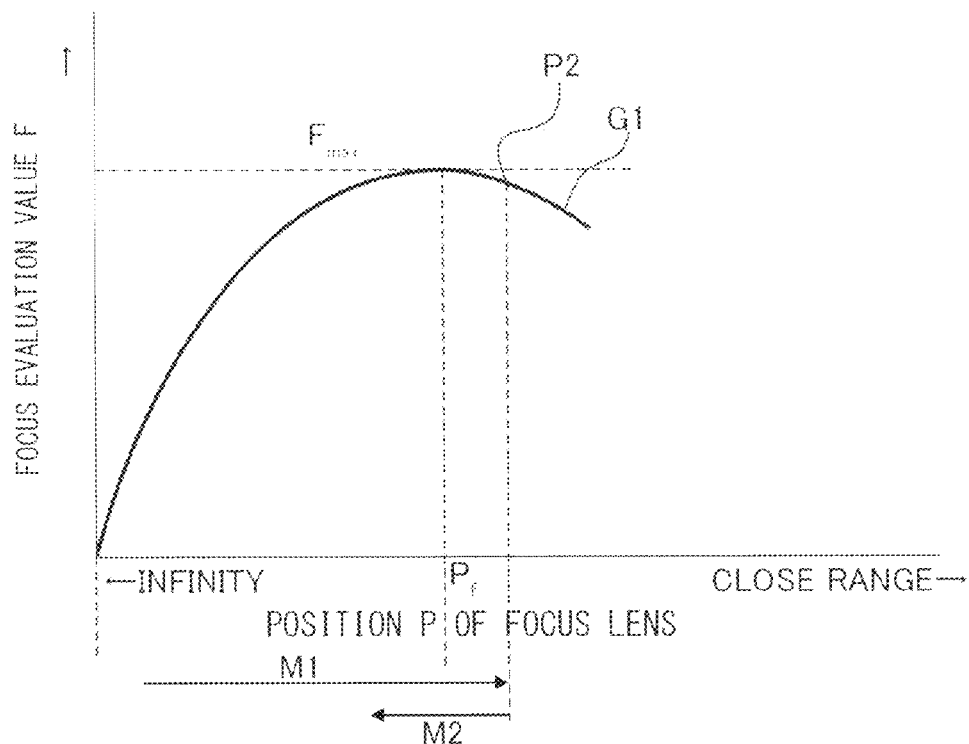
FIG. 8 is a graph illustrating another example of the timing of displaying the focus state confirmation image according to the imaging apparatus.

In this example, in order to detect a maximum value $F_{max}$ of a focus evaluation value F, firstly, the focus lens 1-2a is moved until the focus evaluation value F changes from an increasing trend to a decreasing trend. While moving, the focus lens 1-2a is moved to an in-focus position $P_f$ that is a position corresponding to the detected maximum value $F_{max}$ after detecting the maximum value $F_{max}$. That is, as illustrated in FIG. 8, firstly, the focus lens 1-2a is moved in a direction denoted by an arrow M1. Along with a movement of the focus lens 1-2a in the direction denoted by the arrow M1, a change in the focus evaluation value F to be calculated shows the increasing trend. Then, until the change in the focus evaluation value F starts to show the decreasing trend from the increasing trend, the focus lens 1-2a is controlled to move in the direction denoted by the arrow M1. Thus, to control the movement of the focus lens 1-2a until the change in the focus evaluation value F starts to show the decreasing trend from the increasing trend is control for detecting the maximum value $F_{max}$.

When the maximum value $F_{max}$ is detected, the moving direction of the focus lens 1-2a is reversed in a direction denoted by an arrow M2, and the focus lens 1-2a is moved to the in-focus position $P_f$ that is a position corresponding to the maximum value $F_{max}$. At timing P2 when the moving direction of the focus lens 1-2a is reversed, display of the focus state confirmation image is started. In a state where the focus state confirmation image is displayed, the focus lens 1-2a moves closer to the in-focus position $P_f$ while moving in the direction denoted by the arrow M2, and therefore, it is possible for a user of the digital camera 10 to confirm the degree of focus.

Thus, after detecting the maximum value $F_{max}$ of the focus evaluation value F, that is, after the focus lens 1-2a passes by the in-focus position $P_f$, when the focus lens 1-2a moves to the in-focus position $P_f$, displaying the focus state confirmation image makes it possible to improve usability of the digital camera 100 for the user. Note that in the AF, since the maximum value $F_{max}$ is automatically detected, by displaying the focus state confirmation image, it is possible for the user to recognize that the maximum value $F_{max}$ is detected. Additionally, in the MF, when the user recognizes the maximum value $F_{max}$, and moves the focus lens 1-2a to a position corresponding to the maximum value $F_{max}$ while moving the focus lens 1-2a, the focus state confirmation image is displayed, and therefore, it is possible to move the focus lens 1-2a to the in-focus position $P_f$ precisely.

Figure 9:
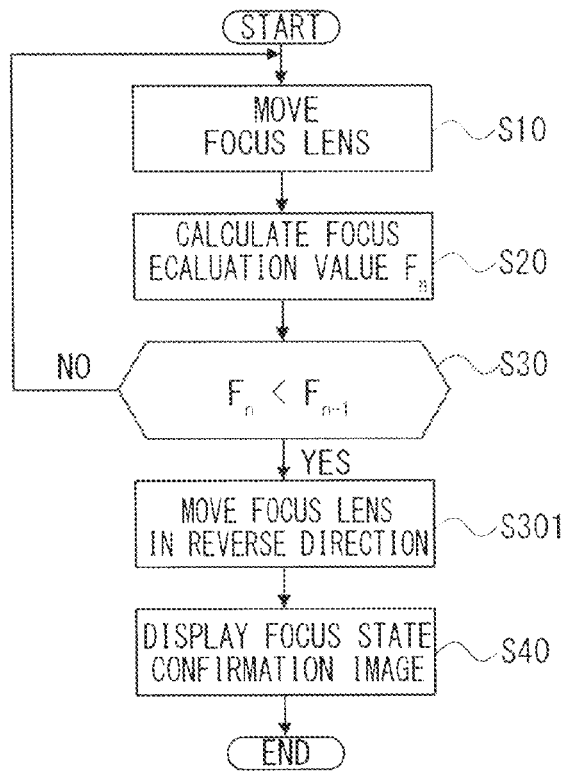
FIG. 9 is a flow diagram illustrating an example of another display operation of the focus state confirmation image according to the imaging apparatus.

Next, an example of a display operation of the focus state confirmation image according to the embodiment of the present invention will be explained by using a flow diagram in FIG. 9. Note that the following explanation supposes the AF; however, the embodiment of the present invention is applicable to the MF.

After power is applied to the digital camera 10 and the focus lens 1-2a moves to an initial position (for example, an infinity position), the AF is started. On the LCD monitor 7, a live view image is displayed, and the focus lens 1-2a moves from the infinity position to the close range position (in the direction of the arrow M1 illustrated in FIG. 8) (step S10). The focus evaluation value F is calculated at intervals of a predetermined time, while moving the focus lens 1-2a (step S20). The calculated focus evaluation value F is stored in a memory (not illustrated) sequentially in chronological order.

Then, "a latest focus evaluation value $F_n$" and "a focus evaluation value $F_{n-1}$ that is stored immediately before" are compared (step S30). When the focus evaluation value $F_n$ is not less than the focus evaluation value $F_{n-1}$ (No of step S30), the focus lens 1-2a is controlled to continuously move in the direction of the arrow M1 (see FIG. 8) (step S10). When the focus evaluation value $F_n$ is less than the focus evaluation value $F_{n-1}$ (Yes of step S30), the focus lens 1-2a passes by the in-focus position $P_f$, and therefore, the moving direction of the focus lens 1-2a is reversed, and the focus lens 1-2a is moved in a direction of the arrow M2 that is an opposite direction to the arrow M1 (step S301). At the timing of this reversal of the moving direction, the focus state confirmation image is displayed on the LCD monitor 7 as the display (step S40).

In the above operation step S30, determination is made by comparing the magnitude of the focus evaluation value $F_n$ and the focus evaluation value $F_{n-1}$; however, in this determination operation, the inclination of the amount of change in the focus evaluation value F can be used. In the case of using the inclination of the amount of change, it is only necessary to determine whether signs ("+", "−") that express the inclination of the amount of change in the focus evaluation value F are different between an inclination of an amount of change in the focus evaluation value $F_n$ and an inclination of an amount of change in the focus evaluation value $F_{n-1}$.

According to the embodiment described above, during displaying the live view image, when the moving direction of the focus lens 1-2a is reversed, it is possible to start to display the focus state confirmation image. That is, while the focus lens 1-2a moves in the direction of the arrow M2 and closer to the in-focus position $P_f$, it is possible to display the focus state confirmation image. As a result, it is possible for the user of the digital camera 10 to confirm a composition and a state of an entire photographic subject, and confirm a degree of focus.

Note that a case of the AF as the example has been explained; however, in a case of the MF, in the operation step S10 and the operation step S301, the movement of the focus lens 1-2a that is performed by operating the focus ring 11 by the user is only different from the case of the AF, and other than the above, the same operations are performed.

Example 3

Figure 10:
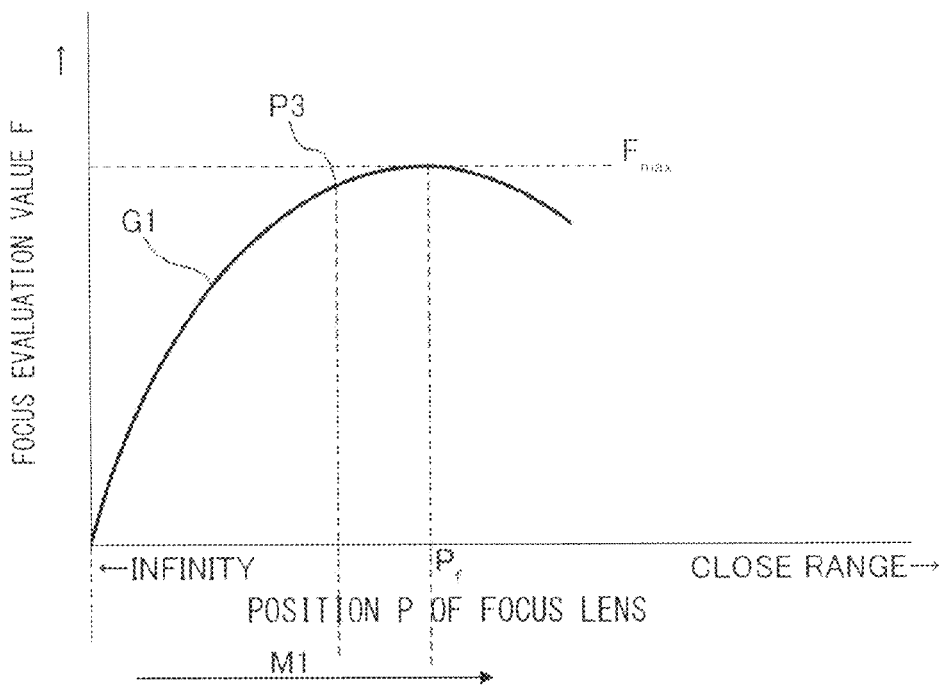
FIG. 10 is a graph illustrating still another example of the timing of displaying the focus state confirmation image according to the imaging apparatus.

Next, still another display timing of the focus state confirmation image performed by the imaging apparatus according to the embodiment of the present invention will be explained. In FIG. 10, a position of the focus lens 1-2a is shown on a horizontal axis, and a magnitude of a focus evaluation value F is shown on a vertical axis. An arrow illustrated under the horizontal axis shows an example of a moving direction and a moving range of the focus lens 1-2a. Reference sign P3 shows an example of display timing that displays the focus state confirmation image.

As already explained, the focus lens 1-2a is controlled to move from an infinity side to a close range side as illustrated by an arrow M1 such that the focus lens 1-2a comes closer to an in-focus position $P_f$ where the focus evaluation value F is a maximum value $F_{max}$. While moving in a direction of the arrow M1, the focus evaluation value F rises; however, a degree of rise decreases as the focus lens 1-2a comes closer to the in-focus position $P_f$ (an amount of change in the focus evaluation value F becomes smaller).

As illustrated in a graph G1 in FIG. 10, the amount of change in the focus evaluation value F becomes smaller with moving closer to the in-focus position $P_f$ than that at the beginning in a moving direction denoted by the arrow M1 (in the vicinity of infinity). Therefore, an absolute value of a difference between a latest focus evaluation value $F_n$ and a focus evaluation value $F_{n-1}$ that is stored immediately before is calculated, and by determining that the absolute evaluation value consecutively becomes smaller at a predetermined number of times, it is possible to determine that the amount of change in the focus evaluation value F becomes smaller (moderate).

When the amount of change in the focus evaluation value F becomes moderate, the focus lens 1-2a is in the vicinity of the in-focus position $P_f$ (reference sign P3). Therefore, by displaying the focus state confirmation image at this timing, it is possible to display the focus state confirmation image while the focus lens 1-2a comes closer to the in-focus position $P_f$.

Figure 11:
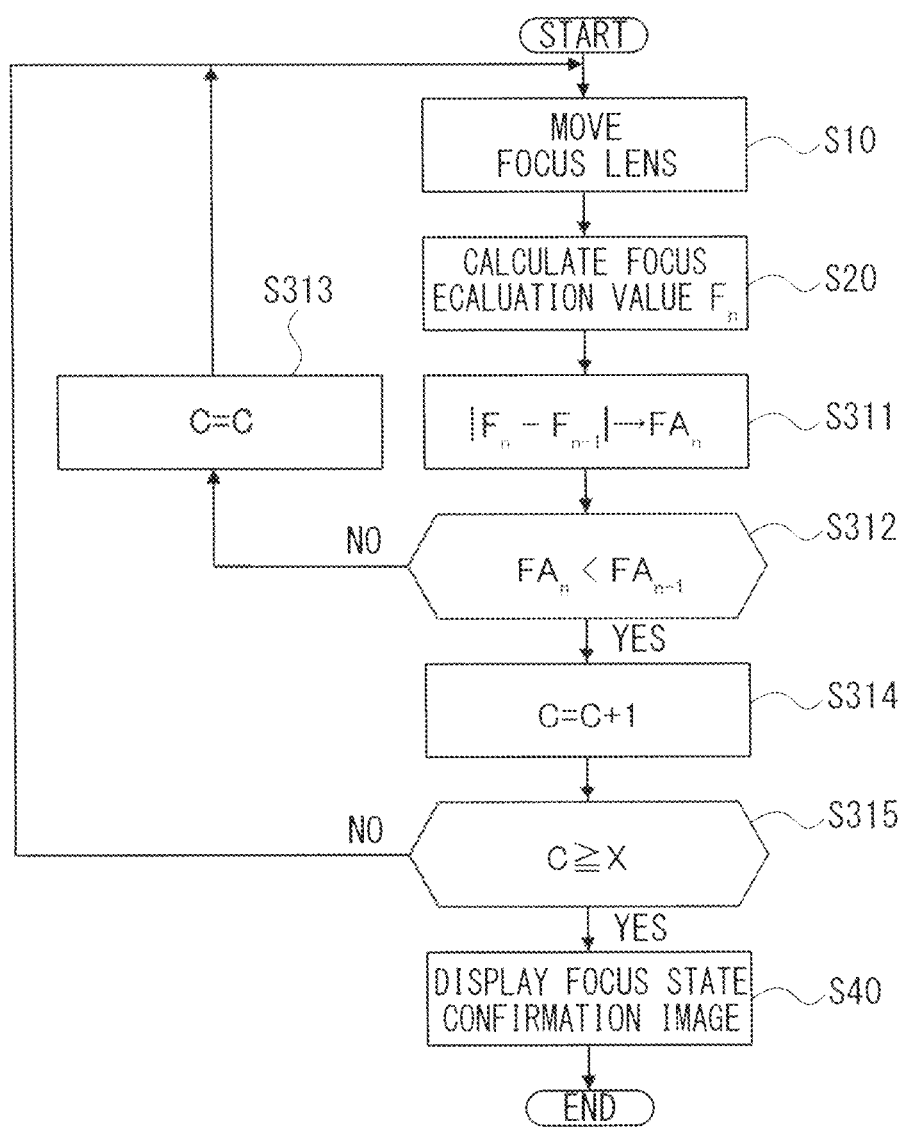
FIG. 11 is a flow diagram illustrating an example of still another display operation of the focus state confirmation image according to the imaging apparatus.

Next, an example of a display operation of the focus state confirmation image according to the embodiment of the present invention will be explained by using a flow diagram in FIG. 11. Note that the following explanation supposes the AF; however, the embodiment of the present invention is applicable to the MF.

After power is applied to the digital camera 10 and the focus lens 1-2a moves to an initial position (for example, an infinity position), the AF is started. On the LCD monitor 7, a live view image is displayed, and the focus lens 1-2a moves from the infinity position to a close range position (in the direction of the arrow M1 illustrated in FIG. 11) (step S10). The focus evaluation value F is calculated at intervals of a predetermined time, while moving the focus lens 1-2a (step S20). The calculated focus evaluation value F is stored in a memory (not illustrated) sequentially in chronological order.

Then, an absolute value FA of a difference between "a latest focus evaluation value $F_n$" and "a focus evaluation value $F_{n-1}$ that is stored immediately before" is calculated (step S311). Then the calculated absolute value FA is stored in a memory (not illustrated) sequentially in chronological order.

Then, "a latest absolute value $FA_n$" and "an absolute value $FA_{n-1}$ immediately before" are compared (step S312). When the latest absolute value $F_n$ is not less than the absolute value $FA_{n-1}$ immediately before (No of step S312), a counter variable C for detecting a state of a change of the focus evaluation value F is set to zero (step S313), and the operation returns to step S10, and the focus lens 1-2a is moved to a next position (step S10). When the latest absolute value $FA_n$ is less than the absolute value $FA_{n-1}$ immediately before (Yes of step S312), one is added to the counter variable C (step S314).

Then, when the counter variable C is not equal to or more than a predetermined threshold value X (No of step S315), the operation returns to step S10. When the counter variable C is equal to or more than the predetermined threshold value X (Yes of step S315), the focus state confirmation image is displayed (step S40). The threshold value X is stored in a memory (not illustrated) in advance.

In the above operation, by determining that at predetermined consecutive numbers of times the amount of change in the focus evaluation value F becomes smaller than before, it is determined that the focus lens 1-2a is in the vicinity of the in-focus position $P_f$.

As for the amount of change in the focus evaluation value F, when an amount of change in the vicinity of the initial position and the amount of change in the vicinity of the in-focus position $P_f$ are compared, the latter amount of change becomes smaller (moderate), and therefore, by the above determination operation, it is possible to determine that the focus lens 1-2a is in the vicinity of the in-focus position $P_f$.

According to the above-described embodiment of the present invention, during displaying a live view image, when the amount of change in the focus evaluation value F along with the movement of the focus lens 1-2a becomes smaller, it is possible to start to display the focus state confirmation image. That is, while the focus lens 1-2a moves closer to the in-focus position $P_f$, it is possible to display the focus state confirmation image. As a result, it is possible for the user of the digital camera 10 to confirm a composition and a state of an entire photographic subject, and confirm a degree of focus.

The present example, regardless of the AF and the MF, is particularly effective for a case of a low-contrast photographic subject, or a case where an aperture of a lens is adjusted to be deep focus. Since change in the focus evaluation value F is small, the low-contrast photographic subject often needs time until the maximum time $F_{max}$ is detected. However, even in the low-contrast photographic subject, as the focus evaluation value F comes closer to the maximum value $F_{max}$, an inclination of change in the focus evaluation value F becomes smaller. That is, by displaying the focus state confirmation image when detecting that the inclination of change in the focus evaluation value F becomes smaller, it is easily possible to confirm an in-focus state in the vicinity of the in-focus position $P_f$, and it is possible to improve usability for the user. Additionally, when the depth of field is larger, and an in-focus range is widened, the amount of change in the focus evaluation value F becomes smaller in the vicinity of maximum value $F_{max}$. In the present example, by using the above, it is possible to detect that the amount of change in the focus state confirmation image becomes smaller, and it is possible to display the focus state confirmation image in the vicinity of the in-focus position $P_f$, and improve the usability for the user.

In each of the above-explained examples, it is preferable that the display of the focus state confirmation image, for example, continue from when the focus lens 1-2a stops at the in-focus position $P_f$ until a predetermined time elapses, or until an image shooting operation is performed by pressing the shutter release button SW1.

Next, the focus state confirmation image displayed on the LCD monitor 7 as the display in each of the examples will be explained. Each of FIGS. 12A and 12B is an image diagram of an enlarged image illustrating an example of the focus state confirmation image displayed on the LCD monitor 7. In FIG. 12A, a rectangle denoted by reference sign 71 illustrates a region frame 71 that is set around the center of a display region of the LCD monitor 7. The region frame 71 can be displayed to be layered on the image of the photographic subject, or can not be displayed on the LCD monitor 7. A partially-enlarged image 71a as an example of the focus state confirmation image is an image displayed in the region frame 71 that is enlarged and displayed on an entire display region of the LCD monitor 7, as illustrated in FIG. 12B.

Generally, a photographic subject around the center of the live view image is often an object to be in focus. Therefore, as illustrated in FIGS. 12A and 12B, the region frame 71 is set, and at the beginning of the AF or the MF, a normal live view image is displayed on the LCD monitor 7. And then, based on the operations performed in Examples 1 to 3, at the display timing of the focus state confirmation image, the partially-enlarged image 71a is displayed.

For the user of the digital camera 10, it is possible to confirm an entire photographic subject by displaying the normal live view image except in a state where the degree of focus is desired to be confirmed. In the state where the degree of focus is desired to be confirmed, the focus state confirmation image is displayed, and therefore, it is possible to confirm the composition and the state of the entire photographic subject, and confirm the in-focus state, and the usability is improved.

Additionally, in the imaging apparatus according to the embodiment of the present invention, it is possible to inform the user that the in-focus state is close by the display of the focus state confirmation image.

Next, another example of the focus state confirmation image will be explained. Each of FIGS. 13A and 13B is an image diagram illustrating another example of the focus state confirmation image displayed on the LCD monitor 7. FIG. 13A is similar to FIG. 12A, and illustrates a region frame 71 that is set around the center of a display region of the LCD monitor 7.

As illustrated in FIG. 13B, an image displayed in the region frame 71 is enlarged in a center part of the display region of the LCD monitor 7, which is taken as a partially-enlarged image 71b that is an example of the focus state confirmation image.

The focus state confirmation image makes it easier to confirm the degree of focus on the photographic subject, and therefore, it is not limited to the one in which a predetermined region in the center of the LCD monitor 7 is enlarged, and the one in which a region that is set by the user in advance can be enlarged. Additionally, it is not necessary to limit the focus state confirmation image to the one in which a part of the live view image is enlarged as described above, and it can be an edge image in which an edge part of the photographic subject is extracted, or an edge-enhanced image in which the image in which the edge part of the photographic subject is extracted overlaps with an original image.

The edge image is created by an edge extractor 1041 as illustrated in FIG. 14. A normal live view image is inputted to the edge extractor 1041, and a predetermined filter operation is performed on brightness data (Y data) of the live view image. The edge extractor 1041 is included in the second imaging signal-processing block 104-2 of the processor 104, for example. A filter included in the edge extractor 1041 can be a high-pass filter (HPF), or a band-pass filter (BPF).

A focus state confirmation image created by using the edge extractor 1041 is an image having only an outline of a live view image (edge image). For example, when an edge image is created by use of a live view image 70 illustrated in FIG. 15, as illustrated in FIG. 16, the edge image is an edge-extracted image 70a in which only an outline is extracted from the live view image. In FIG. 16, for convenience of illustration, only an edge part (outline) is illustrated in white. By visually recognizing the edge part (outline), it is easily possible for the user to confirm the degree of focus.

The edge-extracted image can be another image besides the above. For example, as illustrated in FIG. 17, there is a focus state confirmation image 70b in which only a part corresponding to the region frame 71 is taken as an image of only the edge part, and a part which is not corresponding to the region frame 71 is taken as the normal live view image.

Additionally, as illustrated in FIG. 18, there is a focus state confirmation image 70c in which only an image included in the region frame 71 (see FIG. 17) is taken as an edge image, and the edge image is enlarged, and displayed as an edge-extracted image.

Next, an example of the edge-enhanced image that is an example of a focus state confirmation image will be explained. The edge-enhanced image created by, for example, an outline enhancer 1042 illustrated in FIG. 19 is an image in which only an edge part extracted from a live view image and an original live image are added. The outline enhancer 1042 combines an image in which an edge part is extracted by performing a predetermined filter operation on a brightness value of the live view image and an original image in which a filter operation is not performed, and outputs it. The outline enhancer 1042 is included in the second imaging signal-processing block 104-2 of the processor 104, for example. A filter included in the outline enhancer 1042 can be a high-pass filter (HPF), and a band-pass filter (BPF).

In the edge-enhanced image, a region in which an edge part is extracted can be an entire live view image, only a center part of the live view image, or a region which is set by a user in advance.

FIG. 20 illustrates an example of an edge-enhanced image that is created from the live view image 70 (see FIG. 15) displayed on the LCD monitor 7 by use of the outline enhancer 1042. An edge-enhanced image 70d is one in which an edge part in the image 70 of the photographic subject is enhanced and displayed. Therefore, a part besides the outline part is displayed in white, and the outline part is displayed in black.

The edge-enhanced image can be another image besides the above. For example, as illustrated in FIG. 21, an image 70e of a photographic subject in which only a part corresponding to the region frame 71 (see FIG. 12) is taken as an edge-enhanced image and the rest is displayed as a normal live view image can be also used.

Additionally, for example, as illustrated in FIG. 22, an image 70f of a photographic subject in which only a part corresponding to the region frame 71 is enlarged, and displayed as the edge-enhanced image can be used.

The above-explained focus state confirmation images are applicable to the above examples.

The imaging apparatus according to the embodiment of the present invention makes it possible to start to display a focus state confirmation image when a focus lens comes closer to a vicinity of an in-focus position regardless of AF or MF. As a result, it is easily possible for a user to perform focusing precisely by informing the user that the focus lens is in the vicinity of the in-focus position, and displaying an image that is easy to confirm a degree of focus. Additionally, by displaying a normal live view image other than the vicinity of the in-focus position, it is easily possible to confirm an entire composition.

According to the embodiment of the present invention, it is possible to confirm a composition and a state of an entire photographic subject, and confirm a degree of focus, and therefore, usability is improved.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
   an image sensor which outputs an image corresponding to a photographic subject image formed on an imaging plane;
   a shooting lens which has a focus lens for adjusting a degree of focus on the imaging plane, and forms the photographic subject image on the imaging plane;
   a display which displays the image; and
   a confirmation image creator which creates a focus state confirmation image in which a part, or a whole of the image is enlarged,
   wherein based on the degree of focus on the imaging plane changing from a state lower than a predetermined degree of focus to a state higher than the predetermined degree of focus and then changing to the state lower than the predetermined degree of focus in accordance with movement of the focus lens, the focus state confirmation image corresponding to the state higher than the predetermined degree of focus is automatically displayed on the display in response to the changing degree of focus, the focus state confirmation image is displayed in response to the change of the focus state during a focusing operation, wherein the focusing operation includes movement of the focus lens.

2. The imaging apparatus according to claim 1, further comprising:
   a focus evaluation value calculator which calculates a focus evaluation value based on the image,
   wherein the degree of focus on the imaging plane is determined by the focus evaluation value calculator based on the focus evaluation value obtained.

3. The imaging apparatus according to claim 2, wherein the focus evaluation value calculator determines the focus evaluation value based on brightness of the image.

4. The imaging apparatus according to claim 1, wherein the focus state confirmation image is an enlarged view of a normal live view image.

5. The imaging apparatus according to claim 1, wherein the focus state confirmation image is an edge image extracted from a normal live view image.

6. The imaging apparatus according to claim 1, wherein, in response to the changing degree of focus, display on the display is automatically changed from a normal live view image to the focus state confirmation image.

7. The imaging apparatus according to claim 1, wherein only the focus state confirmation image is displayed as the degree of focus changes in accordance with the movement of the focus lens.

8. An imaging apparatus, comprising:
   an image sensor which outputs an image corresponding to a photographic subject image formed on an imaging plane;
   a shooting lens which has a focus lens for adjusting a degree of focus on the imaging plane, and forms the photographic subject image on the imaging plane; and
   a display which displays the image,
   wherein based on the degree of focus on the imaging plane changing from a state lower than a predetermined degree of focus to a state higher than the predetermined degree of focus and then changing to the state lower than the predetermined degree of focus in accordance with movement of the focus lens, a focus state confirmation image in which a part, or a whole of the image is enlarged corresponding the state higher than the predetermined degree of focus is automatically displayed on the display in response to the changing degree of focus, the focus state confirmation image is displayed in response to the change of the focus state during a focusing operation, wherein the focusing operation includes movement of the focus lens.

9. The imaging apparatus according to claim 8, further comprising:
a focus evaluation value calculator which calculates a focus evaluation value based on the image,
wherein the degree of focus on the imaging plane is determined by the focus evaluation value calculator based on the focus evaluation value obtained.

10. The imaging apparatus according to claim 9, wherein the focus evaluation value calculator determines the focus evaluation value based on brightness of the image.

11. An imaging apparatus, comprising:
an image sensor which outputs an image corresponding to a photographic subject image formed on an imaging plane;
a shooting lens which has a focus lens for adjusting a degree of focus on the imaging plane, and forms the photographic subject image on the imaging plane;
a display which displays the image;
a confirmation image creator which creates a focus state confirmation image in which a part, or a whole of the image is enlarged; and
a degree of focus detector which detects the degree of focus of the imaging plane,
wherein based on detection made by the degree of focus detector that the degree of focus on the imaging plane changes from a state lower than a predetermined degree of focus to a state higher than the predetermined degree of focus and then changes to the state lower than the predetermined degree of focus, the focus state confirmation image corresponding to the state higher than the predetermined degree of focus is automatically displayed on the display in response to the changing degree of focus, the focus state confirmation image is displayed in response to the change of the focus state during a focusing operation, wherein the focusing operation includes movement of the focus lens.

12. The imaging apparatus according to claim 11, further comprising:
a focus evaluation value calculator which calculates a focus evaluation value based on the image,
wherein the degree of focus detector determines the degree of focus on the imaging plane based on the focus evaluation value obtained by the focus evaluation value calculator.

13. The imaging apparatus according to claim 12, wherein the focus evaluation value calculator determines the focus evaluation value based on brightness of the image.

* * * * *